United States Patent [19]
Inoue et al.

[11] 3,820,326
[45] June 28, 1974

[54] OVERHEAT PROTECTION FOR AFTERBURNER SYSTEM

[75] Inventors: Tokuta Inoue; Hiroshi Sawada; Hidemi Ohnaka; Takao Ohshiro, all of Susuono, Japan

[73] Assignee: Toyota Jidosha Kogyo Kabushiki Kaisha, Toyota, Japan

[22] Filed: Apr. 13, 1973

[21] Appl. No.: 350,762

[30] Foreign Application Priority Data
May 1, 1972 Japan.............................. 47-42578

[52] U.S. Cl...................... 60/277, 60/285, 60/900, 123/124 A, 123/124 B, 123/198 DB
[51] Int. Cl............................................. F02b 75/10
[58] Field of Search........ 123/124 A, 124 B, 198 D, 123/198 DB, 103 C; 60/277, 285, 900

[56] References Cited
UNITED STATES PATENTS
| | | | |
|---|---|---|---|
| 1,466,704 | 9/1923 | Du Pont.......................... | 123/124 A |
| 1,977,116 | 10/1934 | Dayes............................. | 123/124 B |
| 2,386,340 | 10/1945 | Olson.............................. | 123/124 B |
| 2,627,850 | 2/1953 | Willim............................. | 123/103 C |
| 3,301,245 | 1/1967 | Woodburn...................... | 123/198 D |
| 3,738,108 | 6/1973 | Goto............................... | 60/277 |

*Primary Examiner*—Douglas Hart
*Attorney, Agent, or Firm*—Toren, McGeady and Stanger

[57] ABSTRACT

In an afterburner installed in an engine exhaust system, a temperature sensor is positioned to establish when the temperature in the afterburner exceeds a predetermined value so that the engine intake system can be placed in communication with the atmosphere and the connection between the accelerator pedal and the throttle valve can be broken off. Consequently, the fuel supply to the engine is interrupted and the afterburner is cooled by the introduced air.

6 Claims, 3 Drawing Figures

3,820,326

OVERHEAT PROTECTION FOR AFTERBURNER SYSTEM

BACKGROUND OF THE INVENTION

The present invention relates to overheat protection for automobile afterburners.

Catalytic converters, thermal reactors and the like have been proposed as afterburners for exhaust gas. When a problem develops in an engine, especially if fire breaks out, a great amount of unburnt gas is supplied into the afterburner. The unburnt gas is burnt in the afterburner and causes an excessive rise in its temperature. As a result, the afterburner may not only lose its purifying capacity but also may cause a fire problem in the vehicle.

In order to prevent afterburners from overheating, as stated above, it has been proposed to bypass the exhaust gas when the temperature of the afterburner exceeds a predetermined value. However, this method requires a complicated bypassing mechanism. Furthermore, the unburnt gas is discharged into the atmosphere, and causes air pollution. It has been also proposed to cool the afterburner by means of secondary air. However, this method requires a large structure for cooling by the air. The most recently proposed method attempts to halt the action of the afterburner by means of a thermofuse. However, if a thermofuse is not replaced, unburnt gas will be discharged into the atmosphere. even after the engine is repaired to eliminate the problem.

SUMMARY OF THE INVENTION

The primary object of this invention is to propose an arrangement for effectively preventing afterburners from overheating by means of a device of simple construction.

According to this invention, an arrangement is provided by which the fuel supply to an engine is stopped and air is simultaneously introduced into the intake system when the temperature of its afterburner becomes excessively high. Thus, the engine itself acts as a blower to feed a large amount of air into the afterburner, for cooling it rapidly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
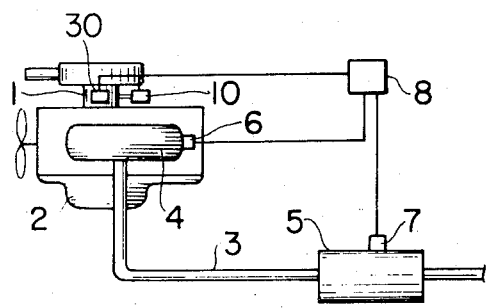
FIG. 1 illustrates schematically the invention systems and its position installed in engine with the exhaust emission purification system.

In FIG. 1, afterburners 4 and 5 are installed on an exhaust manifold and in an exhaust pipe 3, respectively, of an engine body 2 provided with a carburetor 1. The unburnt components of the exhaust gas emitted from the engine are burnt in the afterburners 4 and 5. Each afterburner 4, 5 is provided with a temperature sensor 6, 7, such as a thermistor designed to detect the internal temperature of the afterburner. The outputs of the temperature sensors 6 and 7 are connected to a control element 8. When the temperature of the afterburner 4 or 5 exceeds the allowable temperature, its temperature sensor 6 or 7 transmits an output signal to the control element 8. An air induction mechanism 10 is provided in the carburetor 1 of the engine body 2. Furthermore, a throttle actuator mechanism 30 is provided in the throttle. Both mechanisms 10 and 30 are operated by means of the control element 8 in accordance with the temperature of the afterburners 4 and 5.

Figure 2:
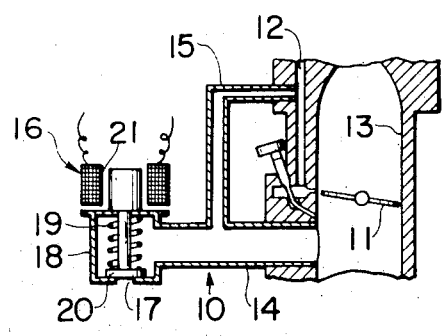
FIG. 2 is a view, partly in section, of an air induction mechanism.

As shown in FIG. 2, the air induction device 10 is associated with the carburetor of the engine and consists of a pipe 14 opening at one end into the passageway of a venturi tube 13 on the downstream side of a throttle valve 11, and opening at its other end to a valve housing 18 of a control valve 16. Intermediate its ends, a pipe 15 is connected to the pipe 14 and is in communication with an idle and low speed fuel circuit 12. The control valve 16 regulates the induction of atmosphere into the pipe 14. In addition to the housing 18, the control valve 16 includes an opening 17 which serves as a valve seat, and a valve body 20 is biased by a spring 19 to close the opening 17. For opening the valve, a solenoid 21 is connected to a stem on the valve body 20 and is actuated by an electrical signal from the output of the control element 8.

Figure 3:
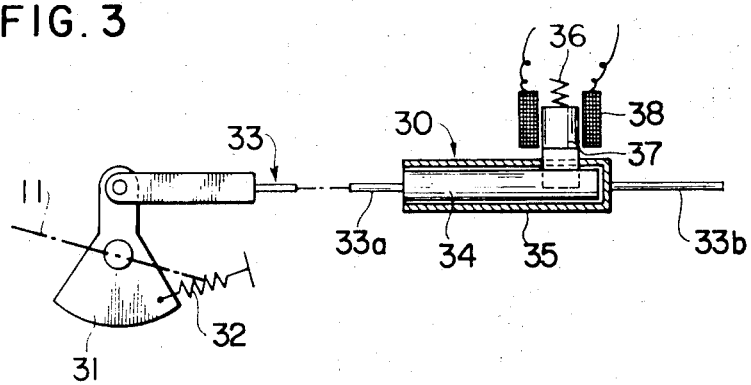
FIG. 3 is a somewhat schematic showing, partly in section, of a detachable coupling between a throttle valve and an accelerator pedal.

As shown in FIG. 3, the throttle actuator mechanism 30 consists of a double-armed lever 31 secured onto the shaft of the throttle valve 11. A spring 32 is attached to one of the arms of the lever 31 for biasing the throttle valve 11 into the closed position. A detachable linkage member or wire 33 is connected to the other arm of the lever 31 for transmitting the depression of an accelerator pedal (not shown) to the lever so as to open the throttle valve.

The wire 33 is made up of two parts, one part 33a is connected to the lever 31 and the other part 33b is connected to the accelerator pedal. A coupling rod 34 is secured to the end of part 33a spaced from the lever 31 and it is slidably positionable into a coupling sleeve 35 connected to the end of the part 33b spaced from the accelerator pedal. Mounted on the throttle actuator mechanism is a displaceable latch pin 37 arranged to engage a corresponding recess in the rod 34 through an opening in the sleeve 35 under the biasing action of a spring 36. The latch pin 37 couples the rod 34 and the sleeve 35 in a detachable manner. The uncoupling of the rod 34 from the sleeve 35 is accomplished by means of a solenoid 38 connected to the output of the control element 8 which withdraws the latch pin 37 from the coupling position in opposition to the spring 36.

When the temperature of the afterburners 4 and 5 exceed the allowable limit, the control element 8 is activated and it energizes the solenoid 21 with withdraws the valve body 20 from the closed position for uncovering the opening 17. Consequently, the passageway of the carburetor 1 and the circuit 12 are brought into communication with the atmosphere through the pipes 14 and 15. A large amount of air is directed into the intake manifold. The engine serves as a powerful blower and supplies the air into the afterburners 4 and 5. At the same time, the fuel supply in the idle and low speed fuel circuit 12 can be stopped by air-bleed. The output of the control element 8 also energizes the solenoid 38 of the throttle actuator mechanism 30. Overcoming the force of the spring 36, the solenoid 38 pulls out the latch pin 37, and uncouples the connection of the parts 33a and 33b. Accordingly, the throttle valve 11 is held in the idling position under the force of the spring 32, regardless of the depression of the accelerator pedal, and therefore the fuel to be fed to the engine is reduced to almost zero. Thus, the afterburners 4 and 5 are exposed to a powerful cooling action for protecting them from overheating. When the temperatures of the afterburners are lower than the allowable limit, no signal is passed from the control element 8 and the air induction mechanism 10 and the throttle actuator mechanism 30 remain in the normal operating condition.

While a specific embodiment of the invention has been shown and described in detail to illustrate the application of the inventive principles, it will be understood that the invention may be embodied otherwise without departing from such principles.

What is claimed is:

1. In an engine including a carburetor, a throttle valve located within said carburetor, a device for operating said throttle valve, an exhaust system, and afterburners associated with said exhaust system, wherein the improvement comprises temperature sensing means associated with said afterburners, means in communication with said temperature sensing means for producing an electrical signal when the temperature in said afterburners exceeds an allowable limit, means for admitting air into said carburetor, said air admission means including a control valve operated by said means for producing an electrical signal, and coupling means for detachably connecting said throttle valve and said device for operating said throttle valve, said coupling means arranged in communication with said means for producing an electrical signal so that when the temperature in said afterburners exceeds the allowable limit said means for producing an electrical signal actuates said control valve for admitting air through said air admission means to said carburetor and actuates said coupling means for detaching said throttle valve from said device for operating said throttle valve for shutting off the fuel supply to the engine.

2. In an engine, as set forth in claim 1, wherein said temperature sensing means comprises a separate temperature sensor in communication with each said afterburner, and each of said temperature sensors conveying a signal to said means for producing an electrical signal.

3. In an engine, as set forth in claim 1, wherein said carburetor includes an idle and low speed fuel circuit, said means for admitting air into said carburetor includes a first pipe connected at one end to said carburetor, said control valve connected to the other end of said pipe, a second pipe connected at one end of said first pipe intermediate its ends and connected at its other end to said idle and low speed fuel circuit, said control valve including a valve body having an opening therein forming a valve seat, a valve member displaceable between a first position closing said opening and at least one other position spaced from the opening, spring means for biasing said valve member into the first position, and means for displacing said valve member from its first position to the other position.

4. In an engine, as set forth in claim 3, wherein said valve member includes a disc-like member closing the opening and a stem connected to and extending from said disc-like member, said spring means comprises a helical spring disposed about said stem and extending between said disc-like member and the opposite end of said valve body, said means for displacing said valve member comprises a solenoid valve disposed about the end of said stem spaced from said disc-like member for displacing said valve member when said solenoid receives an electrical signal from said means for producing an electrical signal.

5. In an engine, as set forth in claim 1, wherein said throttle includes a shaft, a double arm lever positioned on said shaft, a spring connected to one of the arms of said lever for biasing said throttle into the closed position, said coupling means comprises an elongated linkage member connected at one end to the other one of the arms of said lever and at the other end to said device for operating said throttle valve for transmitting the operating movement of said device to said throttle valve, said linkage member comprises a first part connected to said lever, a second part connected to said device, and a detachable coupling member securing said first part and second parts together at the ends thereof spaced from said lever and said device respectively, said coupling member disposed in communication with said means for producing an electrical signal.

6. In an engine, as set forth in claim 5, wherein said coupling member comprises a coupling rod attached to said first part, a coupling sleeve attached to said second part, said coupling rod being slidably positionable within said coupling sleeve, said coupling rod having a recess in its surface positionable within said coupling sleeve, a latch pin extending through an opening in said coupling sleeve into the recess in said coupling rod, a solenoid associated with said latch pin for displacing it from engagement within the recess in said coupling rod so that said first and second parts of said linkage member are uncoupled and it is not possible for said device to operate said throttle valve.

* * * * *